United States Patent
Conwell (10) Patent No.: US 9,149,743 B2
(45) Date of Patent: *Oct. 6, 2015

(54) APPARATUS FOR DEWATERING SOLIDS-LADEN LIQUIDS

(76) Inventor: Michael K. Conwell, New Castle, IN (US)

(*) Notice: Subject to any disclaimer, the term of this patent is extended or adjusted under 35 U.S.C. 154(b) by 489 days.

This patent is subject to a terminal disclaimer.

(21) Appl. No.: 13/296,914

(22) Filed: Nov. 15, 2011

(65) Prior Publication Data

US 2012/0055861 A1 Mar. 8, 2012

Related U.S. Application Data

(63) Continuation-in-part of application No. 12/284,382, filed on Sep. 22, 2008, now Pat. No. 8,070,960.

(60) Provisional application No. 60/997,714, filed on Oct. 4, 2007.

(51) Int. Cl.
| | |
|---|---|
| B01D 29/13 | (2006.01) |
| B01D 29/88 | (2006.01) |
| C02F 11/12 | (2006.01) |
| C02F 11/14 | (2006.01) |
| B01D 29/11 | (2006.01) |
| B01D 29/94 | (2006.01) |
| B01D 29/35 | (2006.01) |

(52) U.S. Cl.
CPC .............. *B01D 29/114* (2013.01); *B01D 29/35* (2013.01); *B01D 29/94* (2013.01); *C02F 11/12* (2013.01); *C02F 11/14* (2013.01)

(58) Field of Classification Search
None
See application file for complete search history.

(56) References Cited

U.S. PATENT DOCUMENTS

| | | | |
|---|---|---|---|
| 3,419 | A | 1/1844 | Watson |
| 392,607 | A | 11/1888 | Heywood |
| 598,391 | A | 2/1898 | Pooler |
| 775,716 | A | 11/1904 | Williams |
| 824,566 | A | 6/1906 | Moss |
| 970,398 | A | 9/1910 | Sapp et al. |
| 2,858,051 | A | 10/1958 | Cunningham |
| 2,865,511 | A | 12/1958 | Hopkins, Jr. |
| 3,191,810 | A | 6/1965 | Johnston |
| 3,295,689 | A | 1/1967 | Arvanitakis |
| 3,419,151 | A | 12/1968 | Smith et al. |

(Continued)

OTHER PUBLICATIONS

Sludge Management Programs Utilizing Geotextile Dewatering Technology; downloaded from Blue Rive Technologies website on Jul. 14, 2014 27 pages.*

(Continued)

*Primary Examiner* — Robert James Popovics
(74) *Attorney, Agent, or Firm* — Overhauser Law Offices LLC (57) ABSTRACT

An apparatus for dewatering slurry utilizes a vertical skeletal retainer framework, having a top end and a bottom end, into which rigid filter plates, a geotextile filter bag, and/or other filter is installed. The vertical orientation employs gravity to induce maximum drainage, with water in the slurry filtering through the plates or bag and falling downwardly. At the bottom end of the framework, doors or gates facilitate selective holding, and emptying of, dewatered solids. A support structure permits a transport vehicle or hopper to be positioned under the framework for collection and removal of dewatered solids. After removal of its contents, the bag can be pressure washed from the outside and potentially reused. The apparatus may be portable, with the framework being pivotable on a wheeled base.

19 Claims, 9 Drawing Sheets

(56) References Cited

U.S. PATENT DOCUMENTS

| | | | | |
|---|---|---|---|---|
| 3,603,567 | A * | 9/1971 | Sackett, Sr. | 366/141 |
| 3,796,316 | A | 3/1974 | Matz | |
| 3,825,119 | A | 7/1974 | Rost | |
| 3,910,173 | A | 10/1975 | Zepponi | |
| 3,931,015 | A | 1/1976 | Jenkins | |
| 3,959,138 | A | 5/1976 | Nichols | |
| 3,960,733 | A | 6/1976 | VanDieren | |
| 3,961,655 | A * | 6/1976 | Nattrass et al. | 383/24 |
| 3,964,636 | A | 6/1976 | Rehrig | |
| 3,970,552 | A | 7/1976 | Bongert | |
| 3,984,320 | A | 10/1976 | Barefoot | |
| 4,116,838 | A | 9/1978 | Lazzarotto | |
| 4,131,546 | A | 12/1978 | Olsson et al. | |
| 4,133,769 | A | 1/1979 | Morgan, Jr. | |
| 4,189,386 | A * | 2/1980 | Aman | 210/235 |
| 4,203,479 | A * | 5/1980 | Mathews | 383/95 |
| 4,303,519 | A | 12/1981 | DelVecchio | |
| 4,306,669 | A | 12/1981 | Grether | |
| 4,307,764 | A | 12/1981 | Nattrass | |
| 4,337,695 | A | 7/1982 | Clendaniel | |
| 4,426,020 | A | 1/1984 | Presseau et al. | |
| 4,518,507 | A | 5/1985 | Conner | |
| 4,603,432 | A | 7/1986 | Marino | |
| 4,604,203 | A | 8/1986 | Kyle | |
| 4,817,824 | A | 4/1989 | LaFleur et al. | |
| 4,839,047 | A | 6/1989 | Shishkin et al. | |
| 4,871,454 | A | 10/1989 | Lott | |
| 4,929,353 | A | 5/1990 | Harris | |
| 4,946,478 | A | 8/1990 | Davis et al. | |
| 5,024,346 | A | 6/1991 | Roser | |
| 5,045,186 | A | 9/1991 | Takashima | |
| 5,110,005 | A | 5/1992 | Schilling | |
| 5,156,749 | A | 10/1992 | Williams | |
| 5,202,020 | A | 4/1993 | Desjoyaux et al. | |
| 5,287,985 | A | 2/1994 | Hatayama | |
| 5,336,408 | A | 8/1994 | Tsutumi | |
| 5,423,611 | A | 6/1995 | Sherrard | |
| 5,433,851 | A * | 7/1995 | Itoh | 210/386 |
| 5,439,598 | A * | 8/1995 | Clough | 210/770 |
| 5,520,824 | A * | 5/1996 | Sasaki | 210/780 |
| 5,558,779 | A | 9/1996 | Eriksson | |
| 5,589,081 | A | 12/1996 | Harris | |
| 5,595,654 | A | 1/1997 | Caughman, Jr. | |
| 5,636,457 | A | 6/1997 | Eriksson | |
| 5,660,055 | A | 8/1997 | Eriksson | |
| 5,681,460 | A | 10/1997 | Caughman, Jr. | |
| 5,692,868 | A | 12/1997 | Riemersma | |
| 5,695,651 | A | 12/1997 | Froud | |
| 5,699,730 | A | 12/1997 | Ogier et al. | |
| 5,707,535 | A | 1/1998 | Harris | |
| 5,776,567 | A | 7/1998 | Schilling et al. | |
| 5,788,449 | A | 8/1998 | Riemersma | |
| 5,804,069 | A | 9/1998 | Eriksson | |
| 5,851,391 | A | 12/1998 | Ozawa | |
| 5,858,226 | A | 1/1999 | Caughman, Jr. | |
| 5,925,258 | A * | 7/1999 | Pryor et al. | 210/770 |
| 5,944,993 | A | 8/1999 | Derrick et al. | |
| 5,947,333 | A | 9/1999 | Hoffmann et al. | |
| 5,961,827 | A | 10/1999 | Bahr | |
| 5,975,642 | A | 11/1999 | Dibble et al. | |
| 6,004,461 | A | 12/1999 | Harris | |
| 6,063,296 | A | 5/2000 | Ackerman et al. | |
| 6,076,702 | A | 6/2000 | Hoffmann et al. | |
| 6,110,388 | A | 8/2000 | Norais et al. | |
| 6,135,293 | A | 10/2000 | Herbst et al. | |
| 6,146,540 | A * | 11/2000 | Nakamura et al. | 210/745 |
| 6,149,803 | A | 11/2000 | DiLoreto et al. | |
| 6,186,360 | B1 | 2/2001 | Becker et al. | |
| 6,186,701 | B1 | 2/2001 | Kempers | |
| 6,190,569 | B1 * | 2/2001 | Parker | 210/770 |
| 6,221,265 | B1 * | 4/2001 | Hoden | 210/770 |
| 6,258,268 | B1 | 7/2001 | Lake | |
| 6,281,001 | B1 | 8/2001 | McNelly | |
| 6,305,845 | B1 | 10/2001 | Navin | |
| 6,305,876 | B1 | 10/2001 | Yoshino et al. | |
| 6,401,983 | B1 | 6/2002 | McDonald et al. | |
| 6,555,013 | B2 * | 4/2003 | Nakamura et al. | 210/769 |
| 6,685,843 | B2 | 2/2004 | Leaverton | |
| 6,797,164 | B2 | 9/2004 | Leaverton | |
| 6,869,539 | B2 | 3/2005 | Sheets | |
| 6,878,266 | B2 | 4/2005 | Leaverton | |
| 6,902,061 | B1 | 6/2005 | Elstone | |
| 6,911,145 | B2 | 6/2005 | Hutchinson et al. | |
| 6,968,946 | B2 | 11/2005 | Shuert | |
| 7,025,318 | B2 | 4/2006 | Hurst et al. | |
| 7,045,068 | B2 | 5/2006 | Hutchinson et al. | |
| 7,112,283 | B2 | 9/2006 | Stephens | |
| 7,188,744 | B2 | 3/2007 | Hurst et al. | |
| 7,314,141 | B1 * | 1/2008 | Day | 210/400 |
| 7,383,766 | B2 | 6/2008 | McIntosh et al. | |
| 7,410,576 | B2 | 8/2008 | Brouillard et al. | |
| 7,819,269 | B2 | 10/2010 | Perkins | |
| 8,070,960 | B2 * | 12/2011 | Conwell | 210/702 |
| 8,074,809 | B2 * | 12/2011 | Brown | 210/350 |
| 2005/0167373 | A1 | 8/2005 | Pancaldi et al. | |
| 2006/0011561 | A1 | 1/2006 | Brouillard et al. | |
| 2006/0102565 | A1 | 5/2006 | Alford | |
| 2007/0034578 | A1 | 2/2007 | Brouillard et al. | |
| 2007/0215533 | A1 | 9/2007 | Tittgen | |
| 2008/0078726 | A1 | 4/2008 | Pancaldi et al. | |
| 2009/0314715 | A1 * | 12/2009 | Conwell | 210/650 |
| 2011/0011811 | A1 * | 1/2011 | Brown | 210/785 |
| 2012/0055861 | A1 * | 3/2012 | Conwell | 210/241 |

OTHER PUBLICATIONS

Dewatering Tower (TM) webpage; 2 pages; Blue River Technologies; downloaded Jul. 14, 2014.*

* cited by examiner

APPARATUS FOR DEWATERING SOLIDS-LADEN LIQUIDS

CROSS-REFERENCE TO RELATED APPLICATIONS

This application is a continuation-in-part of U.S. Non-Provisional application Ser. No. 12/284,382, filed 22 Sep. 2008, and also claims the benefit of U.S. Provisional Patent Application Ser. No. 60/997,714, filed 4 Oct. 2007.

FIELD OF THE INVENTION

This invention generally relates to the process of filtering liquid from a solids laden slurry or waste material. More specifically, it is an apparatus for separating water from solids, leaving the solids inside a filter, from which they can be extracted for disposal or reprocessing. The process is generally known as "dewatering" and is desirable in that it allows the solids to be reprocessed, transported, or disposed of at a lower cost than a liquid.

BACKGROUND

In agriculture, mining, and other industries, there are a wide variety of slurries in need of dewatering. One context is the dewatering of swine, dairy, or beef cattle waste. In confined space, hog, dairy, or beef production, the manure and waste is often collected directly under the barn area. The floors of the barn are slotted, allowing the waste material to accumulate under the barn. This material is diluted by wash water and other liquids and finally is removed by pumping or draining. The waste material is either sent to a lagoon storage area or in many cases used as a fertilizer. The accumulated slurry can be pumped into a tanker truck or wagon and taken to farm fields and applied as liquid manure. Application of this material as a liquid, though, has a number of disadvantages, including environmental damage due to runoff of the liquid into adjacent waterways or ditches. Odor from the liquid manure cause issues with adjacent land owners. Dewatering the waste reduces these liabilities and also reduces the number of trips across the farm fields, reducing soil compaction and lowering fuel costs.

In food processing, slurries are created that contain large amounts of solids which must be removed before the water can be either reused in the process or sent to a waste water treatment facility. Many times these slurries contain solids in need of separation and dewatering, such as potato peelings or grit from the washing processes. In the coal mining process, fine particles of coal are lost in the washing process and must be settled out in large holding ponds. This material can be captured with a proper dewatering process and the coal then reclaimed for sale. In municipal waste water treatment plants, solids are accumulated in digesters. Eventually this slurry must be removed from the digester and dewatered. In the sand and gravel industry the washing process many times produces a slurry stream that contains large amounts of small aggregate material that could be reclaimed by the proper apparatus.

There are many different types of dewatering apparatuses in use today. Many of these are mechanical in nature and require a large amount of energy to operate and specialized skills to maintain. One example is disclosed in Heywood's "Apparatus for Treating Sewage," U.S. Pat. No. 392,607. Another is disclosed in U.S. Pat. No. 3,970,552, "Method and Means for Separation of Liquids from a Mixture of Solids and Liquids," to Bongert.

Other examples of mechanical dewatering equipment for accomplishing high volume dewatering of liquid slurries include the following: U.S. Pat. No. 4,116,838, "Sludge Filter," to Lazzarotto; U.S. Pat. No. 4,929,353, "Portable Liquid-Solid Separator for Bulk Sludge," to Harris; U.S. Pat. No. 5,156,749, "Dewatering System for Sludge Removal," to Williams; U.S. Pat. No. 5,589,081, "Divided Phase Separator for Liquid/Solid Separation in Sludge" to Harris; U.S. Pat. No. 5,595,654, "Sludge Filtration System and Method," to Caughman, Jr.; and U.S. Pat. No. 4,871,454, "Portable Dumpster Slurry Separating System," to Lott. Such systems may utilize a type of filter, but have mechanical disadvantages and often require tilting of sludge.

Another example is U.S. Pat. No. 4,133,769, "Liquid Filter Having Self-Retaining Filter Bag," to Morgan, Jr., incorporating a filter bag suspended inside a shell. This device has a major disadvantage in that the dewatered material must be lifted out of the device to dispose or reprocess, limiting the amount of material that can be effectively dewatered due to the weight of the dewatered material. A similar example of is U.S. Pat. No. 5,287,985, "Container for Dewatering or Packaging and Transportation," to Hatayama. This device has the considerable drawback in that the volume of dewatered material would have to be limited to the weight limitations of the device. Most dewatering processes require large volume and weight capabilities.

Large geotextile bags have been used successfully in dewatering many different types of slurries. Such fabric filter bags are sewn in cylindrical shapes in sizes from six feet in circumference and twelve feet in length to ninety feet in circumference with a length of three hundred 300 feet. Slurry is treated with a flocculent and pumped into the bags, where the solids are captured, and the liquid "bleeds" through the filtration fabric. After the contents have been allowed to dry for various time periods, ranging from a few days to months or even years, the bag is cut open, and the contents are removed. One example of this type of device is found in U.S. Pat. No. 6,186,701, "Elongate Flexible Container," to Kempers.

A further example of existing technology is found in U.S. Pat. No. 7,112,283, "Method and System for Processing Waste," to Stephens. This type of slurry dewatering has disadvantages including the handling expense of the consolidated solids and the fact that the required bags must be laid on the ground and subjected to weather-related and drainage issues. In addition, the positioning of the bag on the ground tends to bind the bottom of the bag, which is where the liquid is most likely to drain out. This will cause the liquid to pool inside the bag and increase the drying time required to accomplish the dewatering phase.

SUMMARY

The present invention may comprise one or more of the following features and combinations thereof.

Addressing the disadvantages of the current dewatering devices, the present apparatus utilizes a vertical skeletal framework, having a top end and a bottom end, into which filter plates, a filter bag, or other filter is installed. At the bottom end of the filter-retaining framework, a set of doors or gates, which can be selectively opened or closed, is utilized for dumping the collected and dewatered solids. The filter plates or bag are easily accessible for cleaning after each use. The vertical orientation of the filter retention framework utilizes the natural forces of gravity to induce maximum drainage of the liquid. There are few moving parts to this apparatus, so maintenance and operational costs are minimal.

In one illustrative embodiment, a steel skeletal framework is utilized as the filter retainer structure. The framework extends vertically and is rectangular or square when viewed from its top, although numerous different sizes and/or framework shapes are possible. For example, one embodiment might have dimensions of three feet in width, six feet in length, and twelve feet in height.

One embodiment of the filter retainer framework is designed to contain a large filter bag that is suspended inside the framework, via straps at the top of the bag and hooks or pins fixed to the top end of the framework. The filter bag is a closed-top bag with a suitable fill port located at the top of the bag. The bottom of the bag is open and of sufficient length to hang below the framework.

The filter retainer framework may sit atop a support structure constructed of iron or concrete that permits a transport vehicle to be positioned under the framework to allow the contents of the bag to fall into the vehicle's bed or a hopper. The doors or gates at the bottom of the framework are capable of closing around the open end of the filter bag. These doors or gates may include an elastic seal that compresses the bag, effectively closing off the bottom of the bag in order to prevent leakage of solids.

Slurry is pumped into the bag through a pipe and a fill port in the bag. The fill port may be at the top of the bag or in the side of the bag. As the slurry is pumped into the bag, a chemical commonly referred to as a flocculent or coagulant may be added, depending on the type of sludge that is to be dewatered. This chemical will cause the solids to separate from the water and form agglomerations. Water will filter through the side walls of the bag and flow down the sides as well as through the bottom of the bag. The water will then fall down into an area where it can be collected and possibly sent to a floor drain. Sheet metal guards can be fabricated to receive the water as it drains from the bag and divert it to pipes if so desired.

While the sidewall of the bag is constrained to prevent bulging, there is little resistance to keep the water from flowing freely out of the bag and draining down the bag exterior. As the slurry builds up in the bag, a hydrostatic head may be employed to force water out of the bag more rapidly. The bag may be pumped to its full capacity and then allowed to dewater. As the water releases from the bag, the dropping slurry level will allow a second slurry pumping in many cases. Following dewatering, the bag is allowed to sit for a period of time, such as one or two days, and then the contents removed.

As indicated, at the bottom of the apparatus is a set of doors or gates that are selectively opened or closed. In one illustrative embodiment, the doors or gates are operated with a set of hydraulic cylinders, but they could also be opened and shut with a mechanical linkage or screw drive. When the bag is dewatered and determined to be only full of solids, the doors or gates will then be opened and the solid material in the bag will fall into a vehicle bed or hopper. After removal of the contents of the bag, the bag can be pressure washed from the outside, leaving the doors or gates open to allow any material that remains on the inside of the bag to be flushed from the bag. One embodiment of this apparatus has an automatic spray wash system mounted on the framework. Spray nozzles would be turned on and the bag flushed automatically. After such washing, the doors or gates are closed and the dewatering process repeated.

In a second illustrative embodiment of this apparatus, the filtration element consists of fixed, rigid plates or panels installed on the skeletal framework for filter retention. These plates could be manufactured from stainless steel, plastic, or aluminum, or another suitable material, and are liquid-permeable, allowing the passage of water while retaining solids. Similar to the bag-based embodiment, at the bottom of the apparatus, a set of doors or gates is installed, and a seal may be included between the bottom of the filter plates and the doors or gates to prevent leakage of solids. In this embodiment, a top set of rigid plates or panels is used to form a closed container, with the top including a flanged port which is connected to a fill pipe.

Whether utilizing plates or a bag, the apparatus may be portable, with the filter retention framework being pivotable on a wheeled base that allows it to be put in a first orientation for transport and a second orientation for dewatering slurry. In the second orientation, the top end of the framework is situated higher than the bottom end.

In any event, the present apparatus provides a very low cost and efficient means for dewatering and disposing of slurry solids. Advantageously, the material dewatered and collected can be mixed with lime, fly ash, or other material and composted for disposal or use as a fertilizer.

Additional features of the disclosure will become apparent to those skilled in the art upon consideration of the following detailed description of the illustrative embodiment.

BRIEF DESCRIPTION OF THE DRAWINGS

The detailed description particularly refers to the accompanying figures in which.

DESCRIPTION OF THE ILLUSTRATIVE EMBODIMENT

For the purposes of promoting and understanding the principals of the invention, reference will now be made to one or more embodiments illustrated in the drawings and specific language will be used to describe the same.

Figures 1, 2:
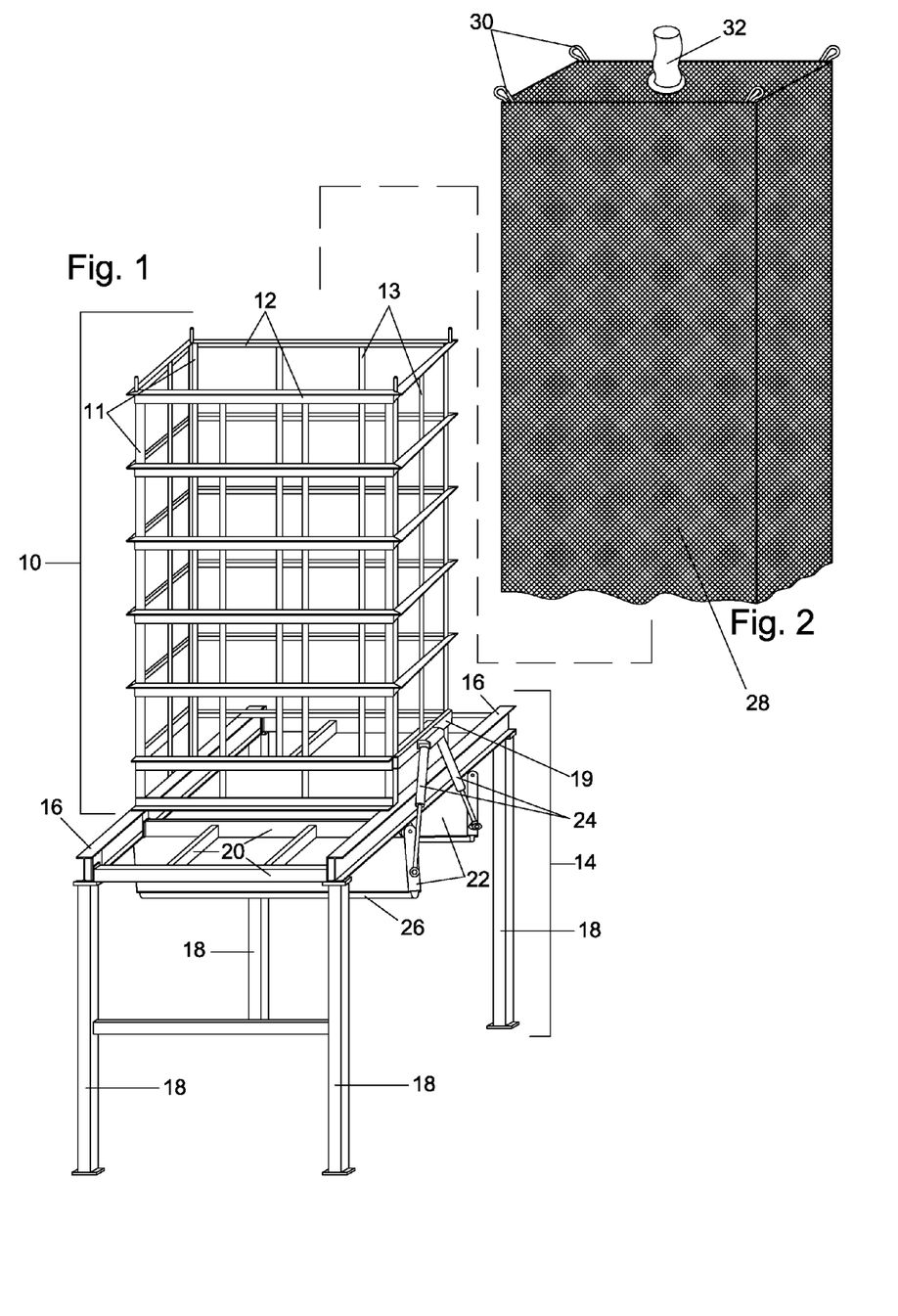
FIG. 1 is an isometric view of an illustrative embodiment of an apparatus for dewatering solids-laden liquids.
FIG. 2 is an isometric view of a filter bag for use with the apparatus of FIG. 1.

An illustrative apparatus for dewatering a solids-laden liquid, such as a slurry, is shown in FIG. 1. In this embodiment, an elongated filter retainer 10 framework, having top and bottom ends, and a supporting undercarriage 14 are depicted. The apparatus filter retainer 10 framework in this embodiment is a skeletal tower configuration, possibly having a height at least 1.5 times its width or depth, and includes a plurality of generally vertical uprights 11 defining a retainer 10 interior. The uprights 11 are connected with a plurality of lateral frames 12 that run in a generally horizontal fashion and, in one embodiment, form rectangles or squares when viewed from above or below. The frames 12 are composed of heavy-angle iron in one embodiment, but could be structural tubing or many other types of materials. In this embodiment, there are six such frames 12, and they are vertically spaced along the tower structure to provide sufficient strength to withstand the pressure created when a retained filtration bag, plates, or other filter element having a sidewall is filled with a substance to be dewatered. This embodiment also employs vertical bars 13 running from the top of the filter retainer 10 framework to the bottom. These bars 13 number six in one embodiment and are in place to help prevent a filtration bag from protruding between the frames 12 as the bag is being filled with the substance being dewatered. Additional support bars can be used as needed to prevent bag protrusion.

As shown, the filter retainer 10 may be fixed to the top of a supporting undercarriage 14 to provide a space for a transport vehicle or hopper, possibly fitted with an auger or conveyor for transporting solids, to be positioned underneath a retained filtration bag, plates, or other filer element. Many different embodiments of this undercarriage 14 supporting structure are possible, including fabricated steel or concrete systems. This embodiment of the undercarriage 14 is constructed with H-beam cross supports 16 that rest upon legs 18, possibly constructed of tubular steel or another sufficiently-rigid material. A framework 20, which also may be made of steel or another rigid material, is fixed to the undercarriage 14 to provide rigidity and support hydraulic actuated doors 22, gates, or other means for closing access to, or discharging, accumulated solids. The doors 22 are connected to the undercarriage framework 20 with heavy hinge blocks 21 and are opened and shut with hydraulic cylinders 24. The cylinders 24 number four in one embodiment and are fixed to one end of the door 22 and a cross member 19 bolted to the filter retainer 10. On the face of each of these doors 22 is an elastomeric seal 26, seen in FIGS. 3 and 3A.

This embodiment of the apparatus utilizes a filter bag 28 to dewater slurry, as shown in FIG. 2. The filter bag 28 may be manufactured from a geotextile filtration fabric and fabricated in a shape including four generally rectangular sidewalls, although other shapes may be used. The corners of the bag 28 can be sewn, overlapped, and glued or heat sealed to produce a leak-free seam at the corners and top. The bottom of the bag 28 is left open while the top is closed. At the top of the bag 28, straps 30 are attached, to provide a means for suspending the bag 28. The number of straps 30 may vary, but four are used in one embodiment.

Figure 2B:
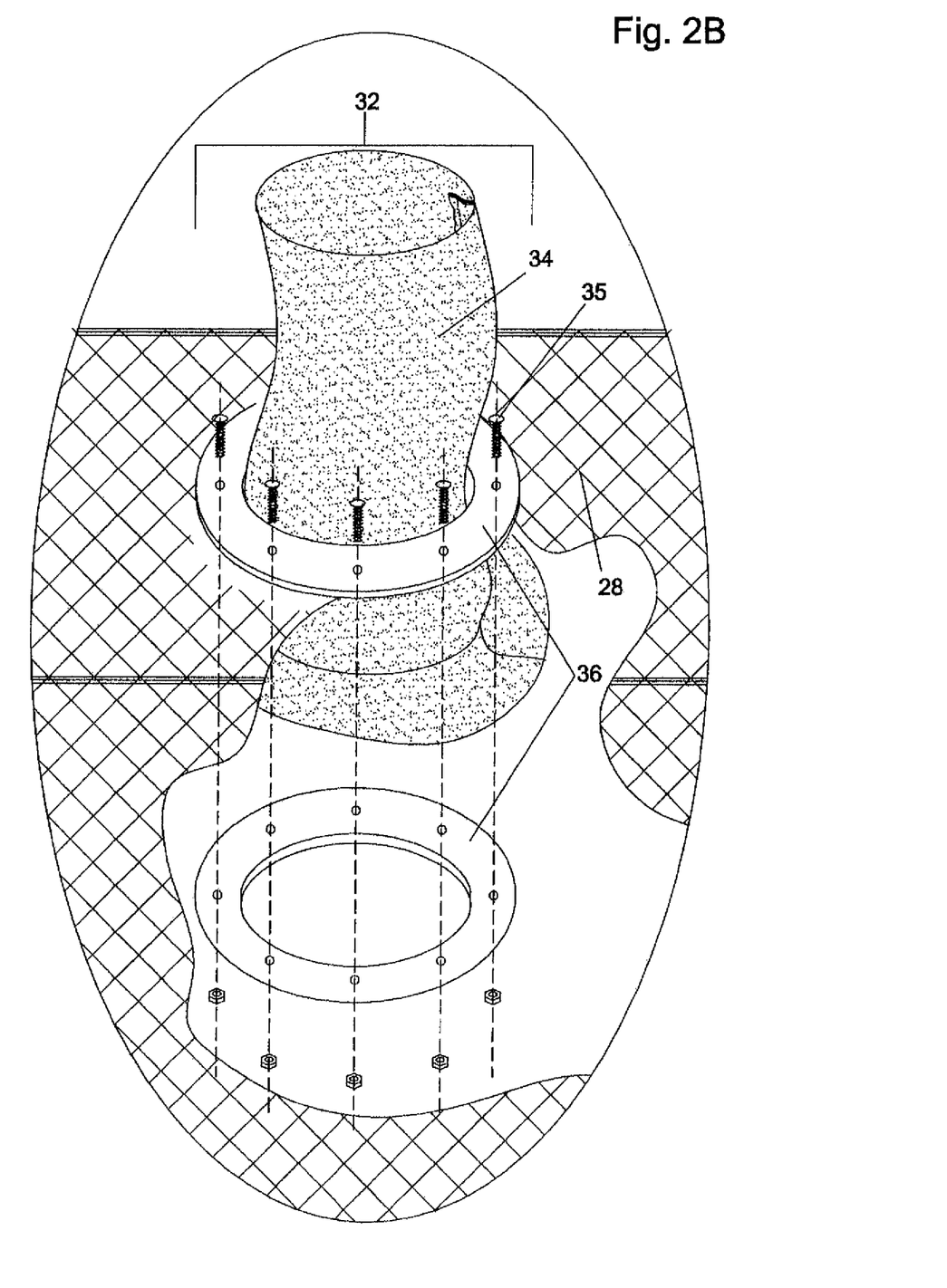
FIG. 2B is an exploded view of a fill port and clamp rings that attach the port to the bag of FIG. 2.

Also at the top of the bag 28 is a port 32 allowing slurry to be pumped into the bag 28. FIG. 2B shows one illustrative embodiment of the bag fill port 32. This port 32 is a non-woven geotextile port fabric 34 sewn into a cylinder and secured to the bag 28 with two clamp rings 36. Many other types of fabric could be used to produce the port 32. The port fabric 34 and bag fabric 35 are trapped between the clamp rings 36 and secured with bolts 38, such as those composed of stainless steel, providing a secure connection.

Figures 3, 3A, 3B:
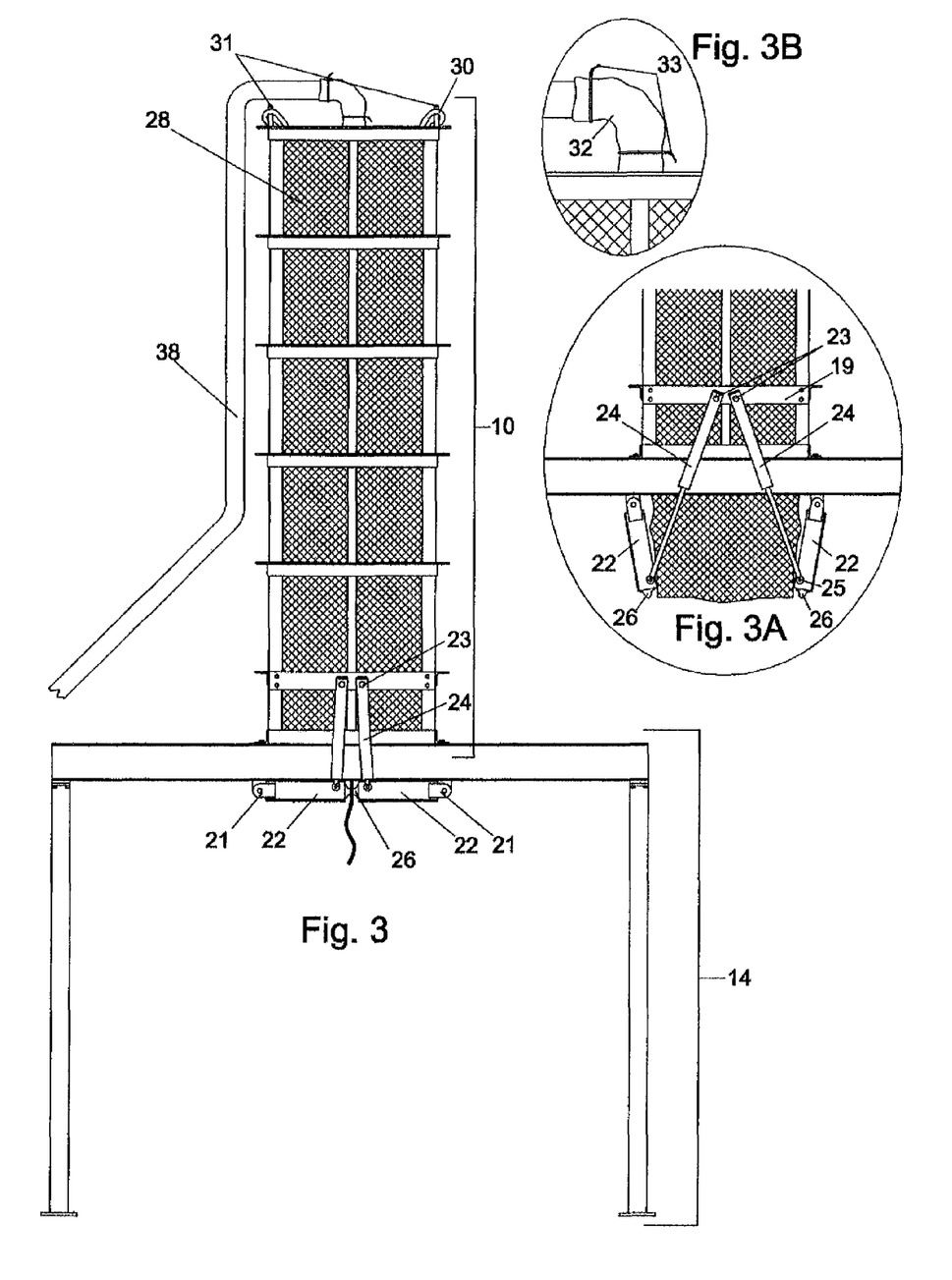
FIG. 3 is a side view of one embodiment of the apparatus of FIG. 1, including the bag of FIG. 2 inside the apparatus.
FIG. 3A is a side view of hydraulic doors in an open position, on the apparatus of FIG. 3.
FIG. 3B is a side view of a fill port of the bag of FIG. 2 attached to a fill tube.
Figure 4:
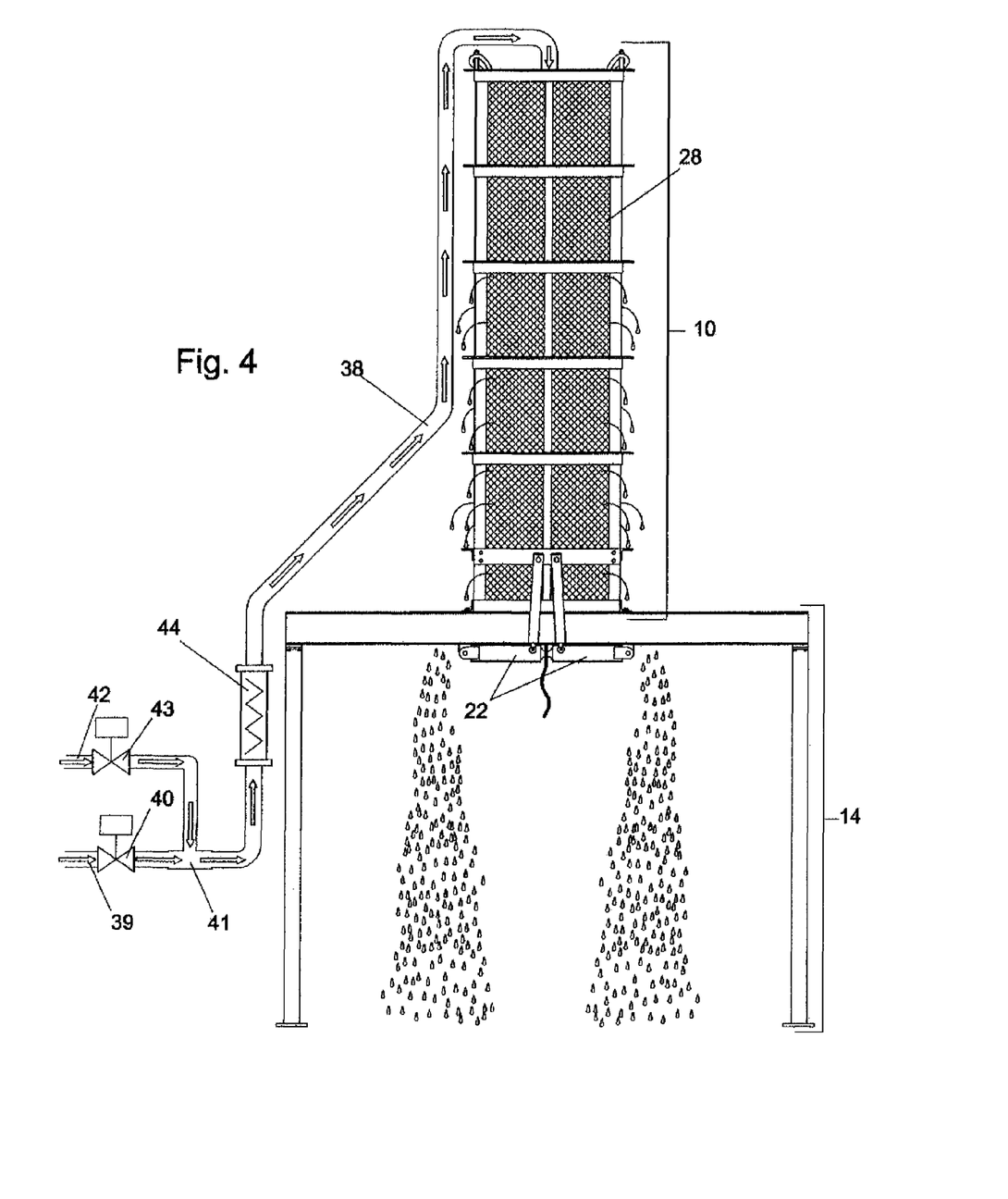
FIG. 4 is a side view depicting the apparatus of FIG. 3 in a dewatering phase.

FIG. 3 is a front elevation view of the filter retainer 10 and the supporting undercarriage 14. In this view, it can be seen that the filter bag 28 has been dropped into the filter retainer 10, and the bag straps 30 are looped over bag retaining pins 31 welded to the top of the retainer 10. The bag straps 30 hold the bag 28 inside the filter retainer 10, generally within the interior, when the doors 22 are in the open position. A bag fill pipe 38 upwardly traverses the filter retainer 10 and proceeds downwardly into the filter bag 28. The fill pipe 38 can be steel or plastic pipe or a fill hose if desired. Slurry is pumped into the filter bag 28 through this pipe 38. The fill port 32 is slipped over and wrapped around the fill pipe 38 and cinched with cable ties 33, as shown in FIG. 3B. Directly underneath the filter retainer 10, in one illustrative embodiment, are two doors 22 that are hinged to open downwardly, as shown in FIG. 3A. Each door 22 is opened and closed by at least one hydraulic cylinder 24 fixed to an end of the door 22 and a cross member 19 bolted to the undercarriage framework 20. The cylinders 24 are fixed to the framework 20 with a pivot pin 23 and fixed to the doors 22 with pins 25 to allow the doors 22 to fully open. When closed, the doors 22 provide closure for the open end of the filter bag 28. On the face of each door, a heavy duty rubber or elastomeric seal 26 is installed so that, when the closed doors 22 meet, they effectively close the bottom of the filter bag 28. A side elevation view of the apparatus' filter retainer and support structure is shown in FIG. 4. In this view, the doors 22 are closed. During a bag 28 fill operation, the doors 22 are preferably maintained in the closed position. Latching mechanisms (not shown) could be added to the doors 22 to ensure that they will not open during the filling operation.

In this embodiment, an injection tee 41 has been installed ahead of the fill pipe 38. Incoming slurry line 39 is equipped with a suitable slurry shut off valve 40. A flocculent or coagulant solution is pumped through a flocculent line 42 and flocculent shut off valve 43 and injected into the incoming slurry. Between the injection tee 41 and the fill tube 38 is a static mixer 44. In the dewatering phase, liquid will cascade down the filter retainer 10 tower structure and may be removed, as needed, by drains located under the structure. Gutters (not shown) can be fabricated that will capture this liquid and divert it into pipes leading to a drain. Installing gutters and capturing the freed liquid will reduce or eliminate the amount of water that falls underneath the structure as the bag 28 is being filled.

With regard to the flocculent or coagulant, prior to pumping any slurry into the filter bag 28, the material to be dewatered should be evaluated to determine if such a chemical is needed to prevent blinding the pores of the bag 28. If it is determined that a flocculent or coagulant is required, the proper mixing equipment and injection pumping equipment could be installed at a location near the dewatering area. The flocculent or coagulant solution would be pumped over to the unit into the flocculent line 42 shown in FIG. 4. In some cases more than one chemical may be required to increase the efficiency of the process. For example, it is known that by adding a coagulant to slurry prior to injecting a flocculent, one may increase the dewatering rate. In that case, the user would have two separate chemical lines and injection points to mix the additional chemical with the slurry.

It is desirable to circulate or agitate the slurry until the solids and liquid are mixed to a uniform state. That is to say, solids in the slurry are preferably evenly distributed so that the percent solids flowing though the line are be relatively constant. The dosage or rate of flow of the flocculent solution is based on volume and percent solids of the slurry to be dewatered. Controlling the flow rate of the slurry to a fixed rate and maintaining the percent solids of the slurry within a narrow range will improve the efficiency of the dewatering process.

When using the apparatus, the operator will begin by turning on the pump from the slurry holding area to the unit and simultaneously turn on the flocculent or coagulant delivery pump. The slurry shut off valve 40 and the flocculent shut off valve 43, as shown in FIG. 4, will be opened, and the slurry and flocculent will flow up and through the static mixer 44. The flocculent will cause the solids in the slurry to agglomerate and separate from the free liquid. These agglomerations of solids are large enough to be held back by the filter bag 28 fabric, but not small enough to blind off the pores of the fabric. As the material flows into the filter bag 28, the liquid will flow through the bag and fall downwardly for capture, although due to flow rate differentials, the filter bag 28 will begin to fill up with both solids and free liquid. In other words, the rate of drainage out of the bag 28 will be somewhat less than the rate of flow into the bag 28. As the material builds up inside the filter bag 28, a column of liquid and solid material begins to form. This column is restrained by the filter retainer 10 and filter bag 28. The column then develops pressure (commonly referred to as head pressure) that assists in forcing more of the free liquid out and though the pores of the filter bag 28.

Eventually the column of material in the filter bag 28 will reach the top of the bag 28. At this point, the slurry shut-off valve 40 and the flocculent shut-off valve 43 should be closed and the pumps shut down. Then, the filter bag 28 is allowed to complete the dewatering process over a period of time. This period may vary from a matter of a few hours to a few days, depending on the type of slurry or other material that is being dewatered. After a suitable period, most of the free water will drain through the pores of the filter bag 28 and fall downwardly. A hydrostatic head may be used to force water out of the apparatus more rapidly. At this point, it may be possible to turn on the slurry and chemical pumps and repeat the filling process. In many cases, multiple pumping and dewatering cycles will be completed before the filter bag 28 will have reached its capacity of retained solids. It may be advantageous to allow the slurry to continue flowing into the filter bag 28 after the slurry column has reached the top of the bag 28. Such continued running of the pumps will develop pressure inside the filter bag 28 that will assist in forcing out the free water.

Figures 5, 6:
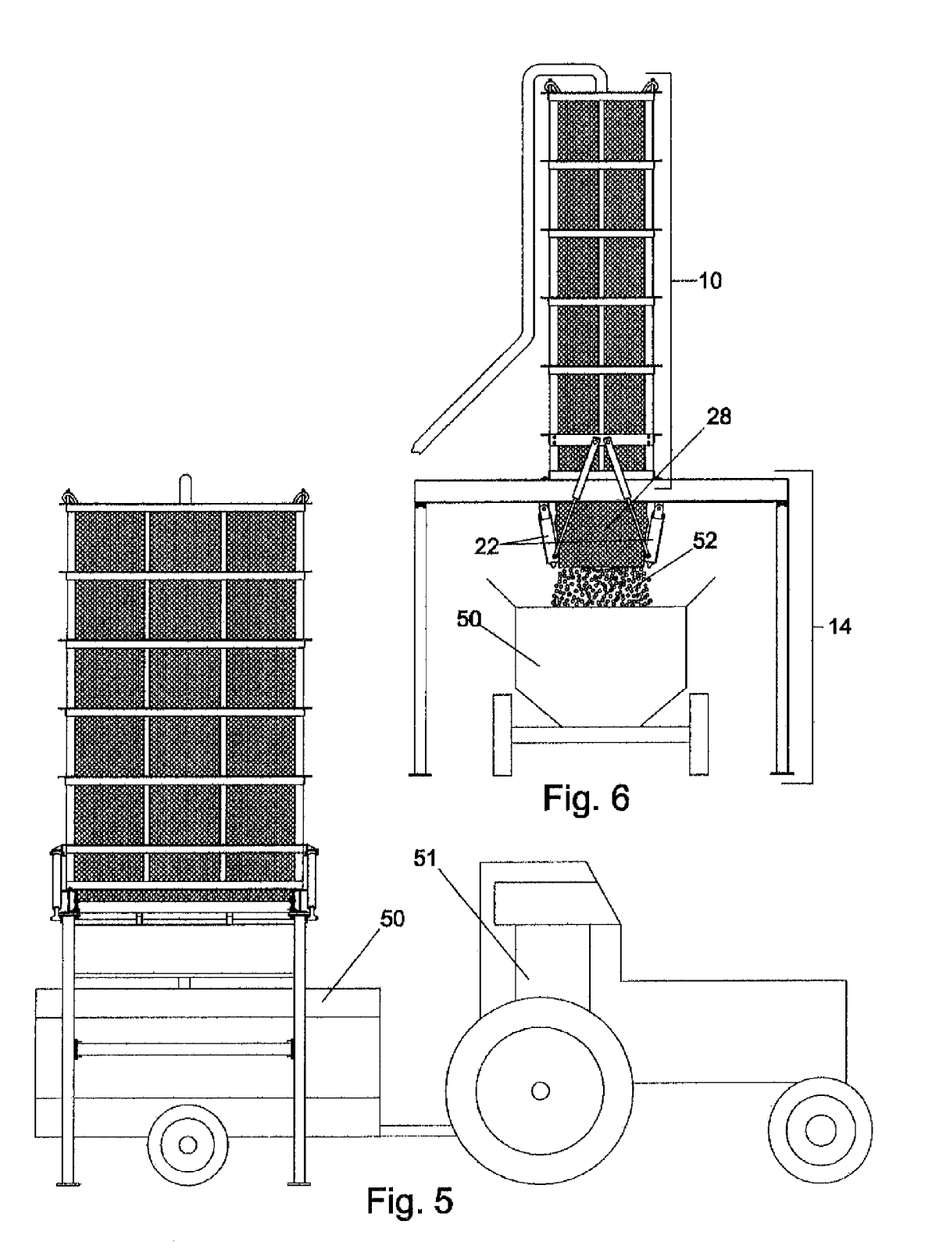
FIG. 5 is a side view of the apparatus of FIG. 3 with a transport vehicle positioned below the tower structure.
FIG. 6 is another side view of the apparatus of FIG. 5 discharging collected contents into the transport vehicle.

When it has been determined that the filter bag 28 has reached its capacity of retained solids, some type of disposal of the material will be required. FIG. 5 shows one embodiment in which a tractor 51 pulls a spreader 50 under the tower structure. FIG. 6 shows the doors 22 opened and the dewatered solids 52 dropping by gravity into the spreader 50. The material may then be taken directly to the field and applied to land as a solid fertilizer. Other embodiments of disposal are possible, including, but not limited to: utilizing a standard landfill roll-off to collect the solids and transporting the material to a storage area; installing a hopper below the supporting undercarriage 14 and utilizing an auger or conveyor to move the material to a storage area or secondary processing area; and dropping the material below the undercarriage 14 and removing it with a loader or pushing it out with a blade.

After the collected material has dropped from the filter bag 28, pressure washing the bag may improve the efficiency of subsequent fill cycles. This washing is easily accomplished with a conventional pressure washing pump and wand. Any number of different styles and configurations of pressure washing devices can be used and even installed and affixed to the apparatus. After completion of the wash process, the doors 22 of the apparatus are closed, and the dewatering process is repeated.

Figure 7:
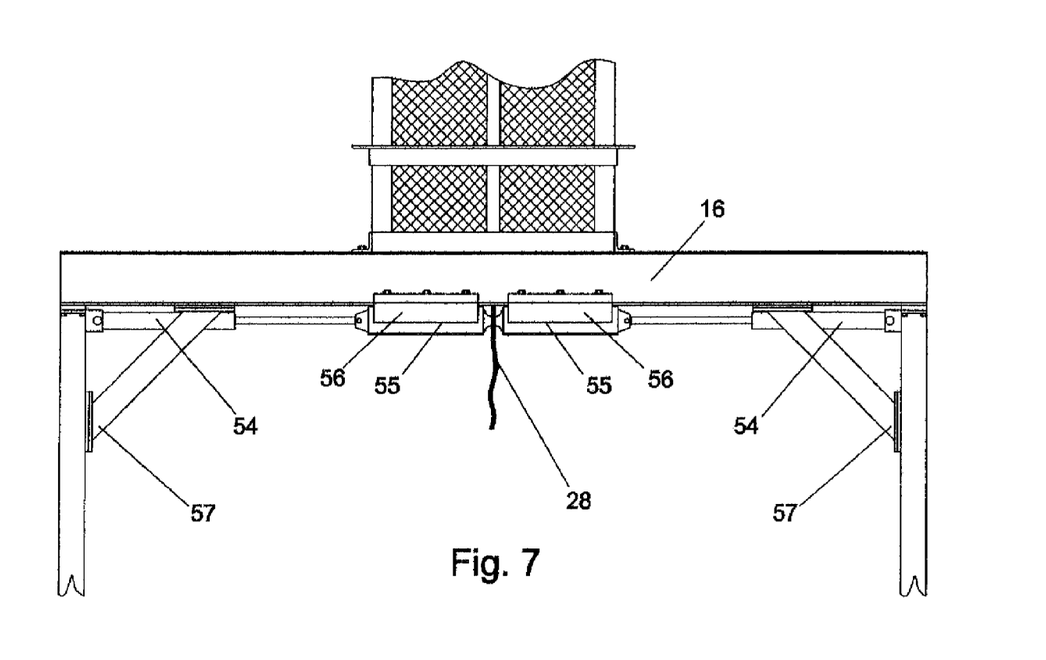
FIG. 7 is a side view of an illustrative alternative embodiment of doors positioned at the bottom of the apparatus of FIG. 3 and in a closed configuration.
Figure 8:
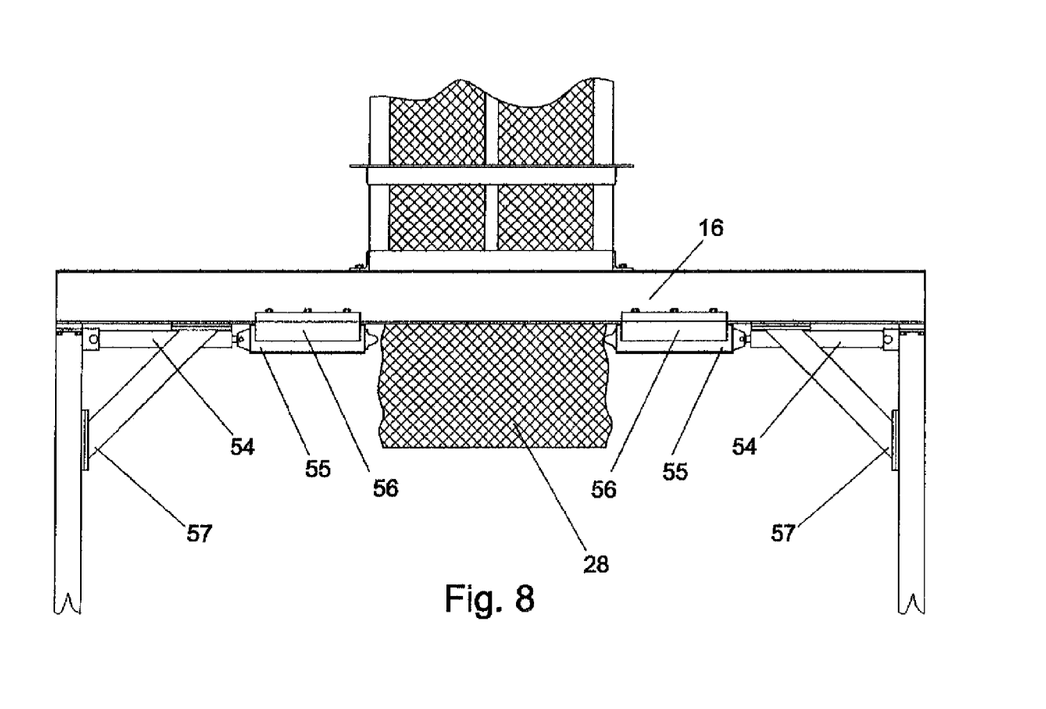
FIG. 8 is a side view of the doors of FIG. 7 in an open configuration.

An alternate embodiment of the door-closing mechanism is shown in FIGS. 7 and 8. In this particular illustrative embodiment, sliding gates 55 are attached to the apparatus by guide rails 56 running on H-beam 16. The sliding gates 55 open and close in a generally horizontal motion through the use of horizontal hydraulic cylinders 54. FIG. 7 shows the sliding gates 55 closed on the end of the bag 28. In FIG. 8 the sliding gates 55 are retracted by the horizontal cylinders 54, and the open end of the bag 28 permits dewatered solids to drop due to gravity. In this embodiment, angle braces 57 provide additional support for the structure.

Figure 9:
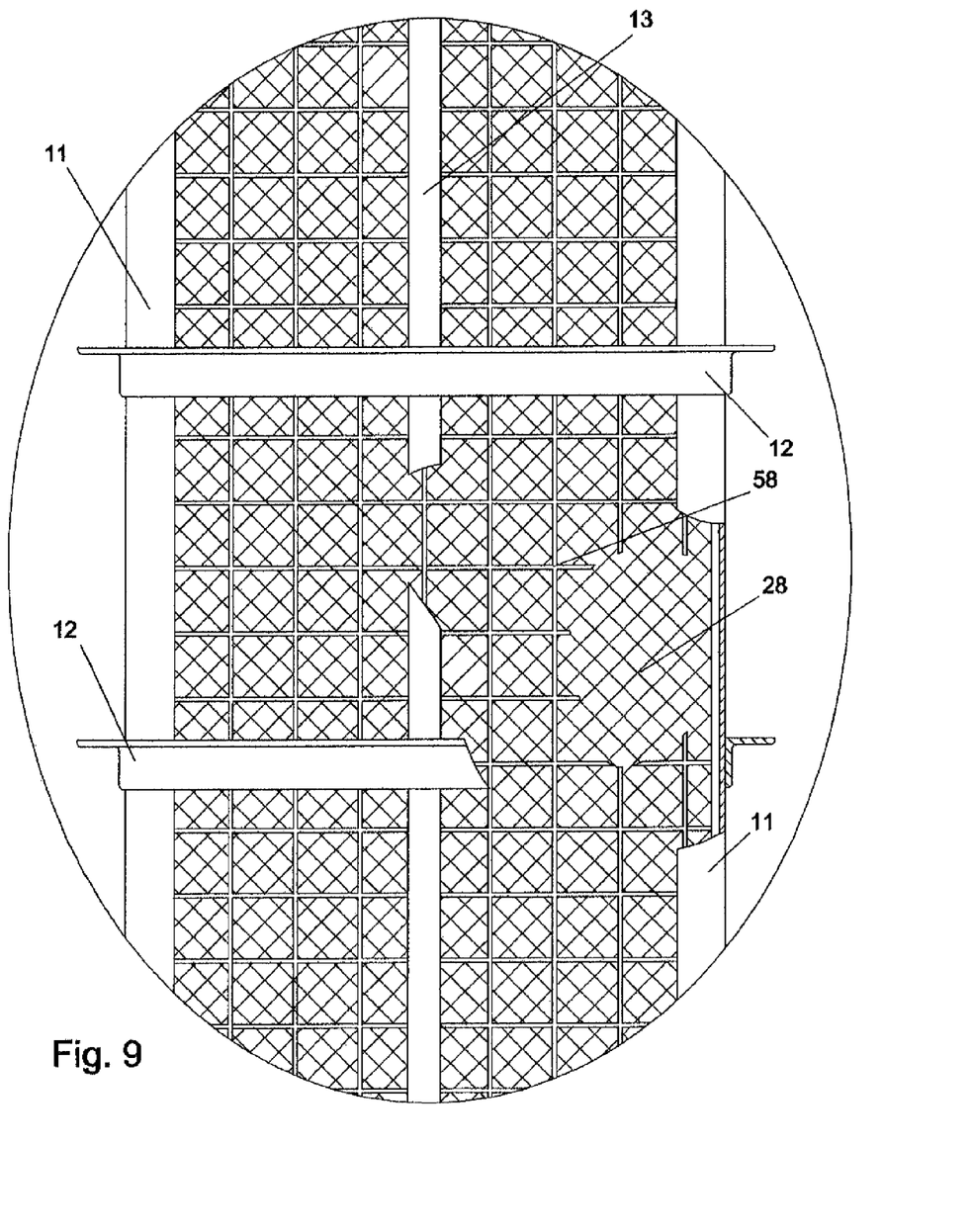
FIG. 9 is a cutaway view of one embodiment of a support grid for the bag of FIG. 2.

In some cases, the material from which the filter bag 28 is manufactured is lightweight and will require some type of restraining device to retain the bag 28. FIG. 9 shows one embodiment of a bag 28 restraining device. A stainless steel wire mesh 58 is installed between the filter bag 28 and the frames 12. The wire mesh 58 can be secured to the vertical uprights 11, the frames 12, and/or the vertical bars 13. The mesh 58 will provide additional support to prevent the bag 28 from protruding between the lateral and vertical supports of the tower structure as the filter bag 28 fills and internal pressure increases as a result. Many other types of material can be used to reinforce these areas such as grating, expanded metal, or plastic mesh.

Figures 10, 10A, 10B, 10C:
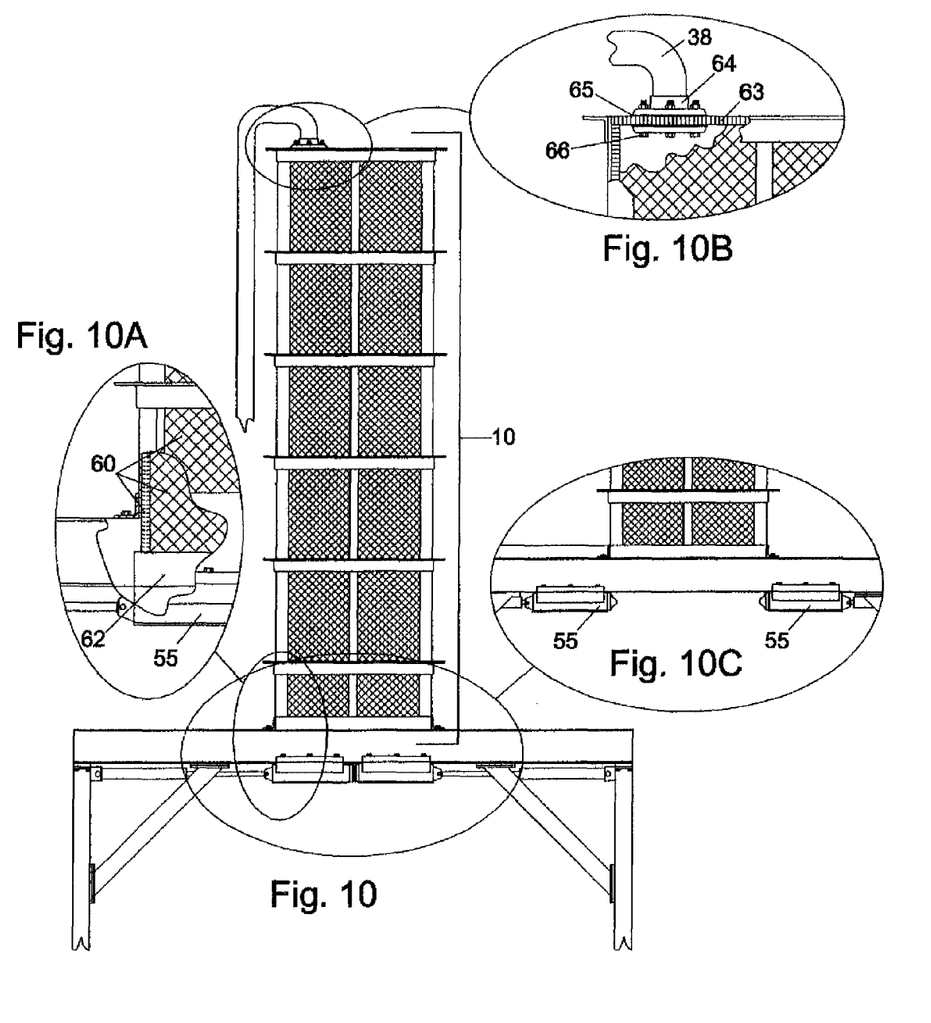
FIG. 10 is a side view of an alternate illustrative embodiment of an apparatus for dewatering solids-laden liquids, utilizing filter plates.
FIG. 10A is a cutaway view of a bottom area of the apparatus of FIG. 10.
FIG. 10B is a cutaway view of a top area of the apparatus of FIG. 10.
FIG. 10C is a side view of another bottom area of the apparatus of FIG. 10.

In an alternate illustrative embodiment, the apparatus' filtration element, instead of a bag 28, consists of rigid, liquid-permeable filter plates 60 fixed to the inside of the filter retainer 10 as shown in FIG. 10A. The plates 60 thus form a container having four sides defining a sidewall, but no bottom. At the bottom of the plates 60, a seal 62 may be installed that would prevent leakage of solids between the bottom of the rigid filter plates 60 and the sliding gates 55. The seal 62 could be an inflatable door seal such as those commonly used to seal sliding doors, but it could be one of many different types, including, but not limited to, a lip seal, O-ring, or some type of spring-loaded mechanical seal.

In this embodiment, the top of the container defined by the plates 60 is closed with a top filter panel 63, as shown in FIG. 10B, although, in some cases, it may be desirable to leave the top area open. In the embodiment with a closed top, a suitable connection between the top filter panel 63 and fill tube 38 is required. One embodiment of this connection is shown in FIG. 10B, wherein a mechanical flange connector 64 with flange seal 65 is installed through the top filter panel 63 and secured with flange bolts 66. It should be noted that the role served by the apparatus' filter element is inclusive and encompasses not only the use of plates 60 and/or a bag 28, but also virtually any other filter component that is liquid-permeable, yet capable of retaining slurry solids within a sidewall. As indicated herein, the filter may not have a closed bottom and rely on the doors 22 or gates 55 for holding and discharging solids.

Figure 11:
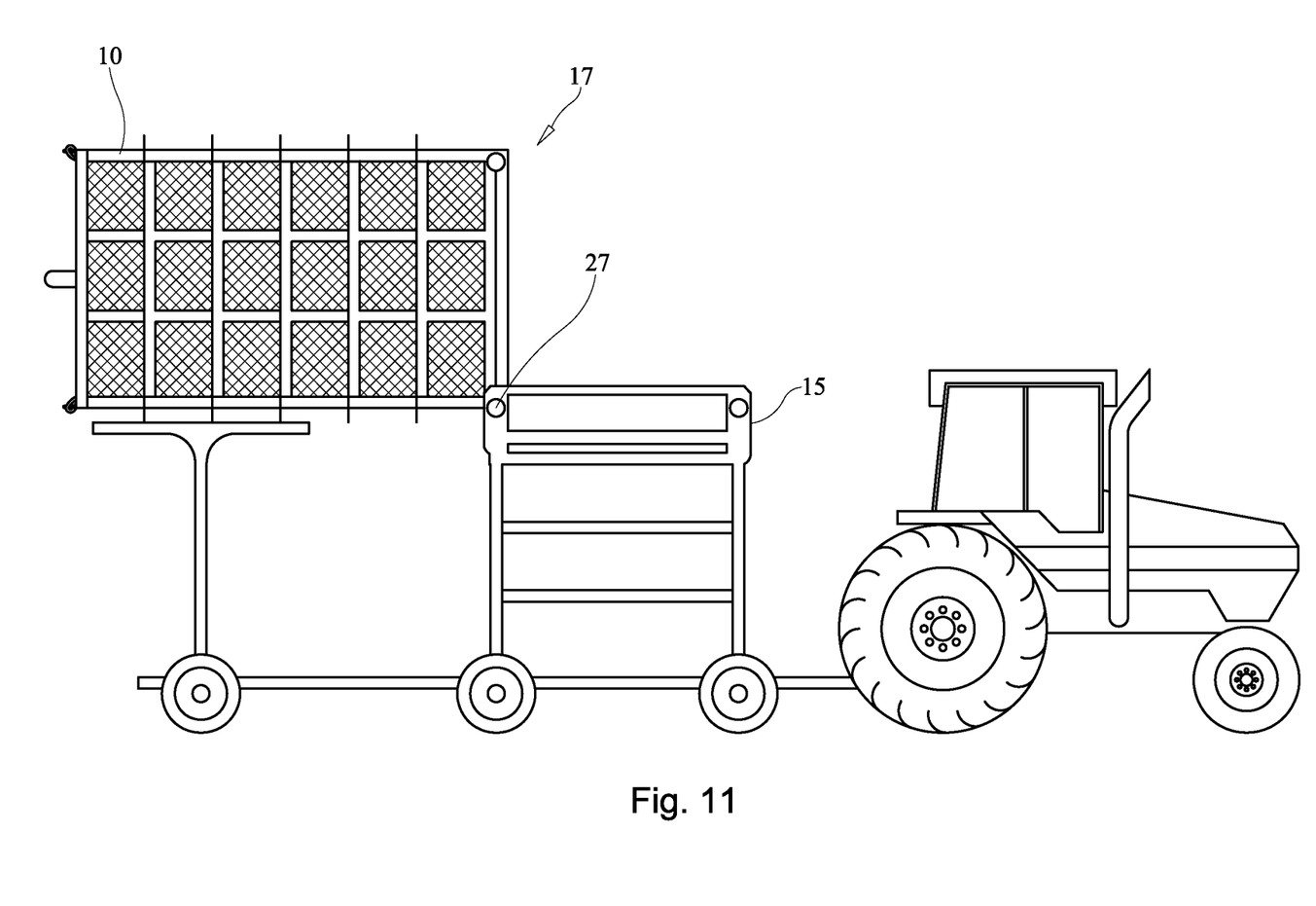
FIG. 11 is a side view of a portable apparatus for dewatering solids-laden liquids in an orientation for transport.

As depicted in FIG. 11, regardless of whether it utilizes plates 60, a bag 28, and/or another element for filtration, the apparatus may be configured to be portable, such as by having the filter retainer 10 pivotable at one or more points 27 on a wheeled undercarriage 15 or other base that allows it to be put in a first orientation 17 for transport and a second, generally upright orientation for dewatering slurry. In the second orientation, the top end of the filter retainer 10 is situated higher than the bottom end. The coupling of the filter retainer 10 and wheeled undercarriage 15 may be accomplished by a number of techniques known in the mechanical art, including, but not limited to, a clevis at the pivot point 27 for securely receiving a fastener such as a pin or a bolt therethrough. To facilitate toggling between the first and second orientations, the pivotable coupling may be lubricated. The filter retainer 10 and undercarriage 15 may thus be transported to a production operation near a tank, barn, or lagoon where liquid slurry has accumulated. If made a permanent installation, a pad or foundation may be constructed upon which the apparatus is placed.

While the invention has been illustrated and described in detail in the foregoing drawings and description, the same is to be considered as illustrative and not restrictive in character, it being understood that only illustrative embodiments thereof have been shown and described and that all changes and modifications which are within the scope of the claimed subject matter are desired to be protected.

The invention claimed is:

1. An apparatus for separating and removing the solids from a liquid-solid slurry comprising:
    a filter retention structure fabricated in a tower configuration with a skeletal framework defining an interior and a bottom;
    a liquid-permeable filter bag or liquid-permeable filter plates installed in the interior of the retention structure; and
    a means for discharging dewatered solids from the slurry through the bottom of the filter retention structure.

2. The apparatus of claim 1 wherein the tower configuration has a height that is at least 1.5 times its width or depth.

3. The apparatus of claim 1 wherein the skeletal framework is configured to prevent the bag or plates from protruding beyond the framework.

4. The apparatus of claim 1 further comprising a support structure wherein the filter retention structure is positioned above the support structure, allowing discharged solids to gravity flow into a transport vessel, hopper, or accumulate on a floor beneath the structure.

5. The apparatus of claim 4 wherein the discharged solids are allowed to gravity flow into a hopper fitted with an auger or conveyor for transporting the solids.

6. The apparatus of claim 1 wherein the filter bag or filter plates are positioned and constrained on the interior of the retention structure to permit the flow of liquid through the bag or plates while retaining the dewatered solids.

7. The apparatus of claim 1 further comprising filter plates, and wherein the filter plates comprise rigid panels configured as an open-bottom container having sides and a top, with at least one opening or port located in the sides or top of the container.

8. The apparatus of claim 1 wherein the means for discharging dewatered solids comprises a set of doors or gates at the bottom of said filter retention structure which, when opened, allow collected solids to discharge from the structure.

9. The apparatus of claim 8 further comprising a seal to prevent leakage of solids.

10. The apparatus of claim 9 wherein the seal is positioned between the filter panels and the doors or gates.

11. The apparatus of claim 1 further comprising a filter bag is comprised of a filtration fabric and has a closed end and an open end.

12. The apparatus of claim 11 wherein the doors or gates close around the open end of the filter bag.

13. The apparatus of claim 1 wherein the apparatus is portable.

14. The apparatus of claim 13 wherein the filter retention structure is pivotable on a wheeled supporting undercarriage or other base allowing the structure to be put in a first orientation for transport and a second orientation for removing solids from a liquid-solid slurry.

15. An apparatus for separating and removing solids from a solids-laden slurry comprising:
    a vertical filter retention structure defining an interior and a bottom, wherein the retention structure has a height that is at least 1.5 times its width or depth;
    a liquid-permeable filter having a sidewall and an open bottom and which is installed on the interior of the retention structure and capable of retaining solids; and
    means for sealing or otherwise closing access to the open bottom of the filter,
wherein water in the slurry may be released through the sidewall of filter and collected solids may be discharged through the bottom of the retention structure.

16. A filter retention structure comprising:
    an elongated, vertically-extending filter retainer comprising a skeletal tower framework having:
        a bottom,
        a plurality of uprights, and
        lateral frames that run horizontally around the uprights and are spaced vertically down the retainer and are configured and arranged to provide sufficient strength to withstand pressure generated by any liquid-solid slurry within the framework, while facilitating gravity drainage of the liquid;
    a liquid-permeable filter installed within the filter retainer; and
    means for discharging dewatered solids from the bottom of the filter retainer,
wherein the filter retainer is positioned above a support structure allowing discharged solids to gravity flow into a transport vessel or hopper and wherein the means for discharging dewatered solids closes around an open end of the permeable filter, preventing leakage of solids during a filling process.

17. The filter retention structure of claim 16 wherein the liquid-permeable filter comprises a bag installed within and suspended from the filter retainer using a plurality of hooks or pins located at an upper portion of the retainer.

18. The filter retention structure of claim 16 wherein the liquid-permeable filter comprises a plurality of rigid plates.

19. A portable apparatus for separating and removing the solids from a liquid-solid slurry comprising:
    a filter retention structure fabricated in a tower configuration with a skeletal framework defining an interior and a bottom;
    a liquid-permeable filter bag or liquid-permeable filter plates installed in or around the interior of the retention structure;
    means for discharging dewatered solids through the bottom of the retention structure; and
    a wheeled base,
wherein the filter retention structure is pivotably coupled to one or more points on the base, allowing the retention structure to be positioned in a first orientation permitting transport and a second orientation for dewatering the liquid-solid slurry.

* * * * *